April 20, 1965   S. B. WALTON ETAL   3,179,340
ROTATABLE GLAND COLLARS FOR SPRINKLER SYSTEMS
Filed June 17, 1963   2 Sheets-Sheet 1
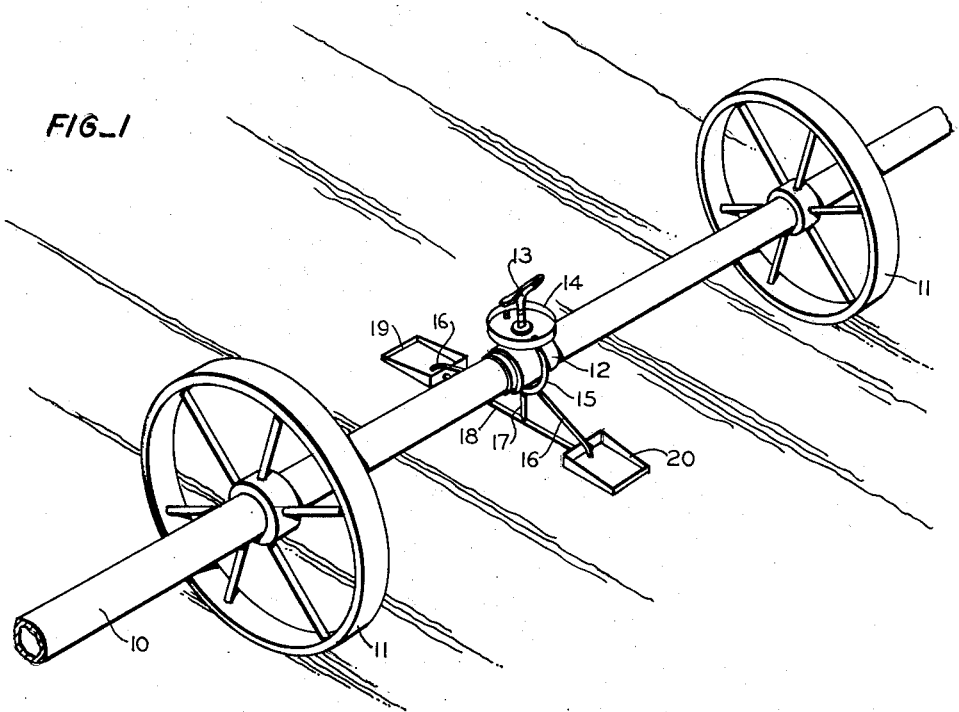
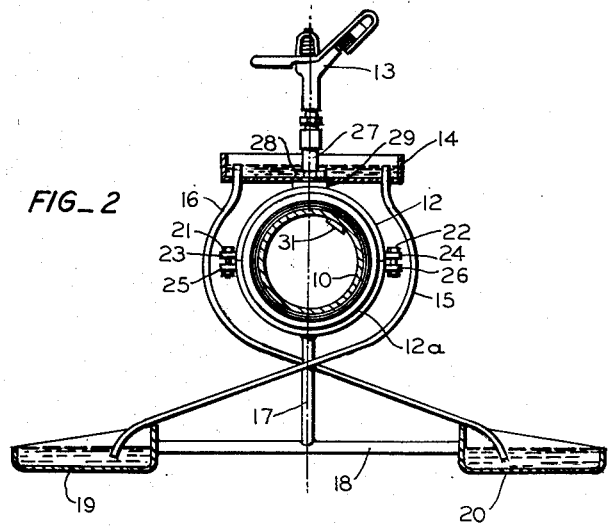
INVENTORS
SYLVAN BROOKS WALTON
RALPH B. POPKINS
BY *Allen and Chromy*
ATTORNEYS April 20, 1965   S. B. WALTON ETAL   3,179,340
ROTATABLE GLAND COLLARS FOR SPRINKLER SYSTEMS
Filed June 17, 1963   2 Sheets-Sheet 2
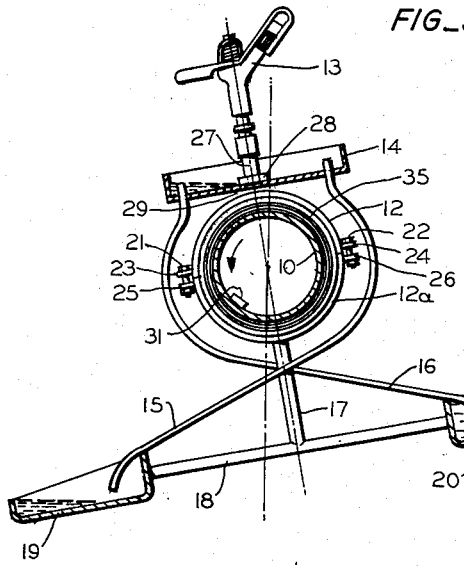
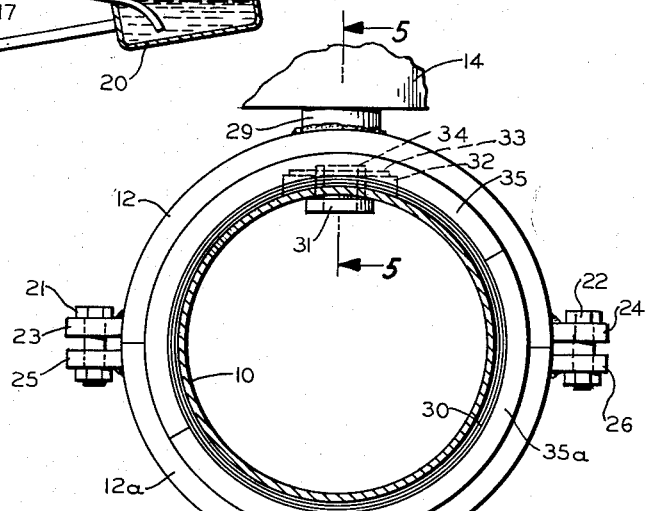
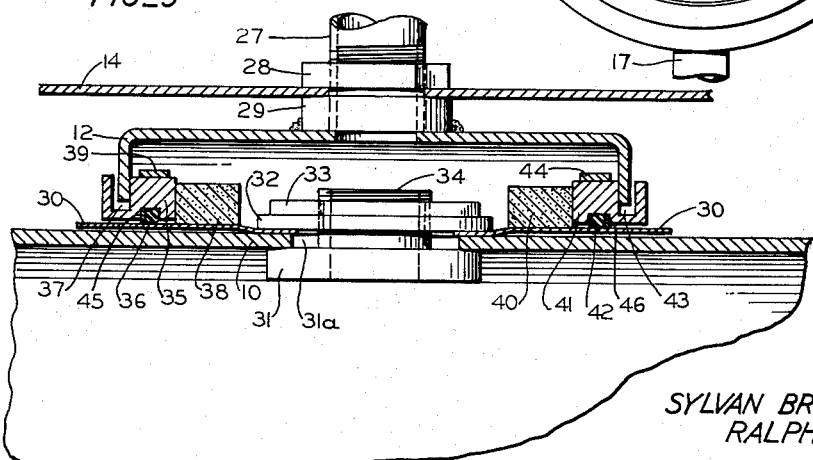
INVENTORS
SYLVAN BROOKS WALTON
RALPH B. POPKINS
BY
ATTORNEYS

3,179,340
ROTATABLE GLAND COLLARS FOR SPRINKLER SYSTEMS

Sylvan Brooks Walton, 21050 Saratoga Hills Road, Saratoga, Calif., and Ralph B. Popkins, 750 Dana, San Jose, Calif.
Filed June 17, 1963, Ser. No. 288,346
4 Claims. (Cl. 239—212)

This invention relates to rotatable gland collars for pipe lines.

An object of this invention is to provide a rotatable gland collar or collars to a pipe line such that the pipe may be turned in the collar or collars and at the same time liquid may be fed from the pipe to a substantially vertical sprinkler that is connected to each collar.

Another object of this invention is to provide an improved gland collar around a fluid supply pipe, the collar being fitted around the pipe to permit turning of the pipe therein and prevent fluid under pressure from escaping between the gland collar and the pipe.

Still another object of this invention is to provide an improved gland collar around a fluid supply pipe so that the pipe may be rotated in the collar with a minimum of friction therebetween while the fluid in and between the gland collar and pipe is under pressure.

A further object of this invention is to provide an improved rotatable gland collar around a fluid supply pipe constructed so as to allow fluid under pressure to enter or leave the space between the pipe and the collar or enter or leave the gland collar through a suitable port in the collar with a minimum amount of fluid leakage between or around the packing seals of the gland.

Still another object of this invention is to provide an improved sleeve around a fluid supply pipe which is rotatable therein, said sleeve which has low friction characteristics, functions as a bearing surface for the gland collar to slide or rotate thereon.

Another object of this invention is to provide an improved gland collar surrounding the fluid supply pipe with a simple and effective means which will permit fluid under pressure to move from the pipe to the space in the gland collar surrounding the pipe without serious loss of fluid between the pipe and the bearing sleeve or between the gland seals and the bearing sleeve.

Still another object of this invention is to provide an improved gland collar with means to maintain minimal fluid leakage and friction for irregular shapes of pipe positioned within the gland collar and rotated therein.

Still a further object of this invention is to provide an improved gland collar with means whereby the collar may be readily assembled or disassembled whereby it may be easily installed on or taken off a pipe without the necessity of disassembling other appurtenances or disconnecting the pipe system.

Another object of this invention is to provide a movable field sprinkler apparatus with a gland collar rotatably positioned on the fluid supply pipe and with an apparatus for automatically holding the sprinkler head that is connected to the gland collar in a substantially upright position.

A further object of this invention is to provide a movable sprinkler or sprinkler system that is connected to a rotatable gland collar which is carried by a fluid supply pipe and which is provided with water-receiving trays or vessels that extend in opposite directions aligned with the direction of movement of the sprinkler, said trays or vessels having an opening in the top or end and being adapted to receive water from the sprinkler so that they act as balancing arms substantially to prevent tilting of the sprinkler head from its vertical or near vertical position.

A further object of this invention is to provide a movable sprinkler or sprinkler system that is connected to a rotatable gland collar which is carried by a fluid supply pipe and which is provided with a water collecting means mounted below the sprinkler which will collect a small portion of the fluid discharged from the sprinkler and direct said fluid to the appropriate one of the two water receiving vessels that extend in opposite directions aligned with the direction of movement of the sprinkler, said trays or vessels being adapted to receive water from the water collecting means so that they act as balancing arms substantially to prevent tilting of the sprinkler head from its vertical or near vertical position.

Other and further objects of this invention will be apparent to those skilled in the art to which it relates from the following specification, claims and drawing in which, briefly:

FIG. 1 is a perspective view of a section of rotatable pipe showing an embodiment of this invention installed thereon;

FIG. 2 is a sectional view across the fluid supply pipe and adjacent to a gland collar of this invention to which there is attached a sprinkler head and apparatus for maintaining the sprinkler head upright;

FIG. 3 is a sectional view similar to FIG. 2 and this view is employed to illustrate the operation of the apparatus employed for maintaining the sprinkler head upright;

FIG. 4 is an enlarged side view of the gland collar; and

FIG. 5 is a fragmentary sectional view taken along the line 5—5 of FIG. 4.

Referring to the drawing in detail, reference numeral 10 designates a fluid supply pipe that is rigidly attached to and supported substantially horizontally over the field or substantially parallel to the ground being irrigated by means of the wheels 11. A gland collar or collars which is provided with two semicircular members 12 and 12a is rotatably supported on the pipe 10 and the sprinkler head 13, which is of conventional construction, and is attached to this collar so that liquid supplied through the pipe 10 is fed to this sprinkler head. Some of the liquid from this head 13 is collected in the tray 14 which is positioned directly below the sprinkler head and small pipes 15 and 16 are connected to this tray so that the upper ends of these pipes open into the tray and supply liquid therefrom flows to the pans or vessels 19 and 20, respectively, which are positioned at the lower ends of these pipes. Pans or vessels 19 and 20 are supported at the opposite ends of the arm 18 and the midportion of this arm is connected by the upright member 17 to the lower member 12a of the collar. The pans or vessels 19 and 20 may be attached to the ends of the arms 18 by welding or the like and the upright member 17 may be attached to the arm 18 and to the lower member 12a of the collar, also by welding or the like.

The pans 19 and 20 are supported substantially in alignment with the direction of movement of the pipe 10. Thus when the pipe 10 is rotated in the direction indicated by the curved arrow positioned therein shown in FIG. 3, the tendency of the collar is to rotate with the pipe, and the extent of this tendency is determined by the friction in the gland collar mechanism. The pans or vessels 19 and 20 will also be rotated to the same extent; and the lower pan or vessel 19 will empty some of the water therefrom while the upper pan or vessel 20 will collect more water, thus making it heavier. Thus, as the weight of the water in pan or vessel 20 increases, a force is introduced which opposes the friction force and will tend to move the sprinkler and gland collar unit in the direction opposite to the rotation of the pipe thus maintaining the sprinkler head substantially in its vertical upright position.

Of course, if the direction of rotation of the pipe 10 is opposite to that shown, then the pan or vessel 19 will be elevated so that it assumes a position higher than the pan or vessel 20. As a result, more water would be collected in the pan or vessel 19 than in the pan or vessel 20 and also some of the water would be emptied from pan 20 so that, in this case also, the sprinkler head would be maintained in substantially the upright vertical position because of the different amounts of water accumulated in pans 19 and 20.

The upper half of the collar member 12 is provided with a threaded nut member 29 which is attached thereto and the opening through this threaded member is aligned with a similar opening in the member 12 as shown in FIG. 5. The tray 14 is positioned over the nut 29 and is provided with a hole which is also aligned with the holes through nut 29 and member 12. These holes are adapted to receive the pipe 27 which is threaded into the nut 29 and which is provided with an additional nut 28 above the tray 14 for tightly gripping this tray and holding it in fixed position on the pipe 27. The pipe 27 extends upward and the sprinkler head 13 is attached to the top end portion thereof.

The semi-circular members 12 and 12a of the collar each have the end portions thereof inturned so as to provide flanges that extend into the grooves 37 and 43 of the seal rings 35 and 41, respectively, illustrated in FIG. 5. Each of these seal rings 35 and 41 is made in two semi-circular sections, and the ends of these abut. Thus the seal ring 35 is made with a bottom section 35a, as shown in FIG. 4, and the ends of these semi-circular sections abut. The same is true of seal ring 41. The seal rings 35 and 41 are also provided with internal grooves for receiving the O-rings 36 and 42 which are pressed into engagement with the sleeve 30 which is of flexible material having a low friction co-efficient and is resistant to weather.

The sleeve 30 is provided with a hole which is in alignment with the hole 31a that is formed in the pipe 10. The sleeve 30 is held around the pipe 10 by means of a hollow threaded tube 34 which is provided with a shoulder 31 and a nut 33 threaded thereto so that the sleeve 30 is clamped thereby to the pipe 10. The sleeve 34 is positioned in the hole 31a formed in the pipe 10 and provides a port through which liquid is supplied to the cavity in the collar 12 and to sprinkler 13 from the supply pipe. A gasket 32 is positioned around the tube 34 and engages the sleeve 30. The threaded nut 33 is positioned on the threaded tube 34 and functions to clamp the sleeve 30 against the pipe 10 and the gasket 32 against the sleeve. A hole through the tube 34 forms a communicating passageway between the inside of the pipe 10 and the inside of the collar members 12 and 12a during the rotation of the pipe with respect to these collar members so that liquid is fed from the pipe 10 into the collar.

Filter seal rings 38 and 40 are positioned on the sleeve 30 and attached thereto. These rings press against the seal rings 35 and 41, respectively, to retard or substantially prevent sand or other gritty materials contained in the fluid from entering the space between the sleeve 30 and the seal rings 35 and 41. These filter seal rings 38 and 40 rotate with the pipe and they are attached to the sleeve 30 by suitable cement. The pressure of the water inside the gland collar 12 and 12a forces the seal rings 35 and 41 against the inwardly extending flanges of the collar members which extend into the grooves 37 and 43 of these respective seal rings, and suitable bands 39 and 44 are provided around these seal rings 35 and 41, respectively. These seal rings are made in two parts, and these parts are of semi-circular configuration so that the ends thereof abut and they may be cemented together. Thereafter the bands 39 and 44 are applied thereto.

The O-rings 36 and 42 provide sealing surfaces and low friction bearing surfaces between the gland collar structure and the sleeve 30 during rotation of the pipe 10 and sleeve 30 in the gland collar. In addition to the O-rings 36 and 42, gaskets 45 and 46 of variable friction co-efficient materials may be interposed between the O-rings 36 and 42, respectively, and the walls of the seal rings 35 and 41, respectively. The O-rings 36 and 42 and the gaskets 45 and 46 are split or cut so that they may be readily placed around the sleeve 30 and the abutting ends of these O-rings and gaskets are cemented or otherwise held together after they are assembled on the sleeve 30.

While we have shown and described a preferred embodiment of the invention, it will be seen that it is capable of variation and modification from the form shown so that its scope should be limited only by the scope of the claims appended hereto.

What we claim is:

1. In a movable sprinkler the combination comprising a fluid supply pipe, means comprising wheels for supporting said pipe substantially horizontal or parallel to the ground as it is moved over a field being irrigated, sprinkler head means, means for supporting said sprinkler head means on said pipe normally vertical with respect to said pipe, said supporting means comprising a rotatable gland collar surrounding said pipe, said collar having a cavity communicating with the inside of said pipe, said supporting means including a pipe connected with said cavity and with said sprinkler head means so that fluid is supplied to said sprinkler head means from said pipe, forwardly and rearwardly extending fluid collecting means normally supported by said rotatable gland collar in a substantially horizontal position and means for supplying fluid to said collecting means from said sprinkler head means so that said collecting means tends to maintain said sprinkler head means oriented substantially vertically with respect to said pipe when said pipe is moved laterally over the field being irrigated.

2. In a movable sprinkler the combination comprising a fluid supply pipe, means comprising wheels for supporting said pipe substantially horizontal as it is moved over a field being irrigated, sprinkler head means, means for supporting said sprinkler head means on said pipe normally vertical with respect to said pipe, said supporting means comprising a rotatable gland collar surrounding said pipe, said collar having a cavity of annular shape surrounding said pipe and communicating with the inside of said pipe, a sleeve attached to said pipe positioned around said pipe under said collar, said collar having fluid tight sealing means engaging said sleeve, said supporting means including a pipe connected with said cavity and with said sprinkler head means so that fluid is supplied to said sprinkler head means from said pipe, forwardly and rearwardly extending fluid collecting means normally supported by said rotatable gland collar in a substantially horizontal position and means for supplying fluid to said collecting means from said sprinkler head means so that said collecting means tends to maintain said sprinkler head means substantially vertical with respect to said pipe when said pipe is moved laterally over the field being irrigated.

3. In a movable sprinkler the combination comprising a fluid supply pipe, means comprising wheels for supporting said pipe substantially horizontal as it is moved over a field being irrigated, sprinkler head means, means for supporting said sprinkler head means on said pipe normally vertical with respect to said pipe, said supporting means comprising a gland collar surrounding said pipe and adapted to be rotated on said pipe, said collar having a cavity communicating with the inside of said pipe, said supporting means including a pipe connected with said cavity and with said sprinkler head means so that fluid is supplied to said sprinkler head means from said pipe, forwardly and rearwardly extending fluid collecting means normally supported by said rotatable gland collar in a horizontal position under said sprinkler head means so that said fluid collecting means collects substantially equal amounts of fluid from said sprinkler head means when in a horizontal position and said rearwardly extending fluid collecting means collects more fluid when said sprinkler head means and said fluid collecting means are tilted as a result of moving said pipe laterally in the forward direction, the weight of the additional fluid in said rearward fluid collecting means prevents further tilting of said collar and tends to maintain said sprinkler head means substantially vertical with respect to said pipe during said lateral movement over the field being irrigated.

4. In a movable sprinkler the combination comprising a fluid supply pipe, means comprising wheels for supporting said pipe in a substantially horizontal position or parallel to the ground as it is moved over a field being irrigated, sprinkler head means, means for supporting said sprinkler head means on said pipe normally vertical with respect to said pipe, said supporting means comprising a gland collar surrounding said pipe, said collar having a cavity communicating with the inside of said pipe, said gland collar having fluid sealing means between it and said pipe to prevent fluid leakage and permit rotation of said collar on said pipe, said supporting means including a pipe connected with said cavity and with said sprinkler head means so that fluid is supplied to said sprinkler head means from said pipe, fluid collecting means attached to said rotatable gland collar to counteract the tendency of said collar to rotate with said pipe and to maintain said sprinkler head means substantially vertical with respect to said pipe when said pipe is moved laterally over the field being irrigated.

References Cited by the Examiner

UNITED STATES PATENTS

| 2,744,785 | 5/56 | Lundegreen | 239—212 |
| 2,831,710 | 4/58 | Edmonson | 285—190 |
| 3,002,697 | 10/61 | Jones | 239—212 |
| 3,045,922 | 7/62 | Jensen | 239—212 |
| 3,071,327 | 1/63 | Cornelius | 239—212 |
| 3,088,759 | 5/63 | Corsette | 285—190 |
| 3,090,566 | 5/63 | Snyder et al. | 239—212 |

FOREIGN PATENTS

| 425,774 | 2/26 | Germany. |
| 217,436 | 5/58 | Australia. |

LOUIS J. DEMBO, *Primary Examiner.*

EVERETT W. KIRBY, *Examiner.*